United States Patent [19]
Bernstein et al.

[11] 4,152,107
[45] May 1, 1979

[54] PREHEATING OF SECONDARY AIR FROM COMBUSTION CHAMBER RADIATION

[75] Inventors: Gerald Bernstein, Brooklyn, N.Y.; John P. Gallagher, Jr., Pennsauken, N.J.

[73] Assignee: Combustion and Energy Corporation, Pennsauken, N.J.

[21] Appl. No.: 811,579

[22] Filed: Jun. 29, 1977

[51] Int. Cl.² .................................... F23D 11/44
[52] U.S. Cl. ............................ 431/165; 431/190; 431/242; 431/243
[58] Field of Search ............... 431/164, 165, 242, 243, 431/190, 11; 110/72 R

[56] References Cited
U.S. PATENT DOCUMENTS

| | | | |
|---|---|---|---|
| 805,671 | 11/1905 | Saffell | 431/164 |
| 1,857,667 | 5/1932 | Stadler | 431/165 |
| 2,440,491 | 4/1948 | Schwander | 431/190 X |
| 2,660,230 | 11/1953 | Denker et al. | 431/164 X |
| 4,050,877 | 9/1977 | Craig et al. | 431/165 X |
| 4,060,374 | 11/1977 | Kwait | 431/190 |

*Primary Examiner*—Edward G. Favors
*Attorney, Agent, or Firm*—Paul R. Adams

[57] ABSTRACT

In an oil fired boiler (with a combustion chamber and a burner which blows a flame into it) there is a J-shaped heat-exchange duct, built on the combustion chamber floor out of thermally ultra-conductive and non-corroding pipes and fittings. Because of the extreme rigidity and brittleness of these, our structure is designed with masonry-like constraints on duct layout: Must rest on floor—never two attachments to anything—must not rely wholly on cement for stability.

The J-duct becomes hot from the radiation in combustion chamber. It serves to heat secondary air and delivers it at suitable discharge regions from which it will join the base of the entering flame.

The tip of J's long leg is outside chamber and gets secondary air from blower. This leg extends into chamber through its front wall then, curving around, its short leg extends forward and ends at location next to front wall's hot face. The heated air is either discharged at this location through an orifice, or else is carried up in a tower-like riser duct and discharged at a higher discharge point almost directly above the location where the short leg ends.

23 Claims, 14 Drawing Figures

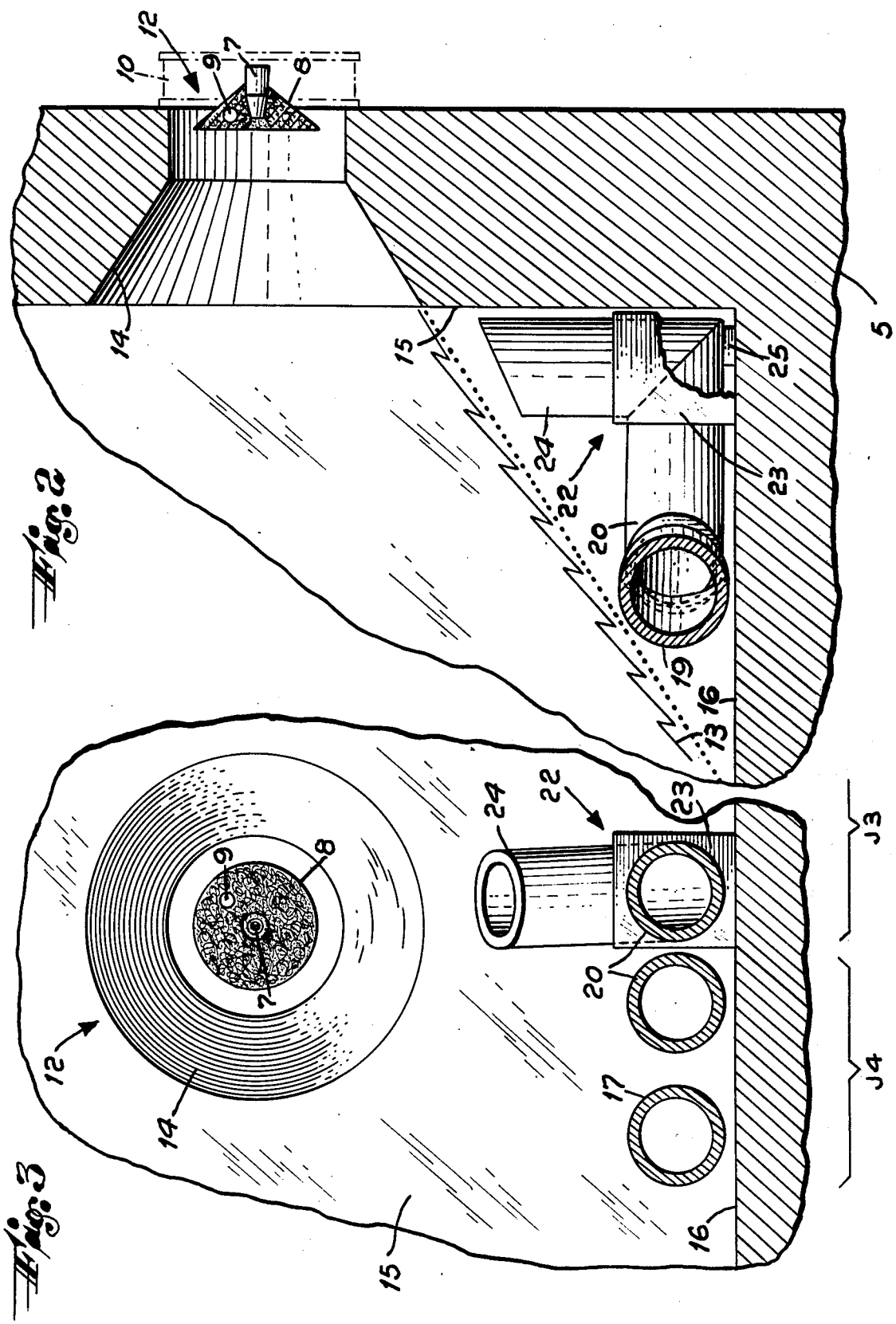

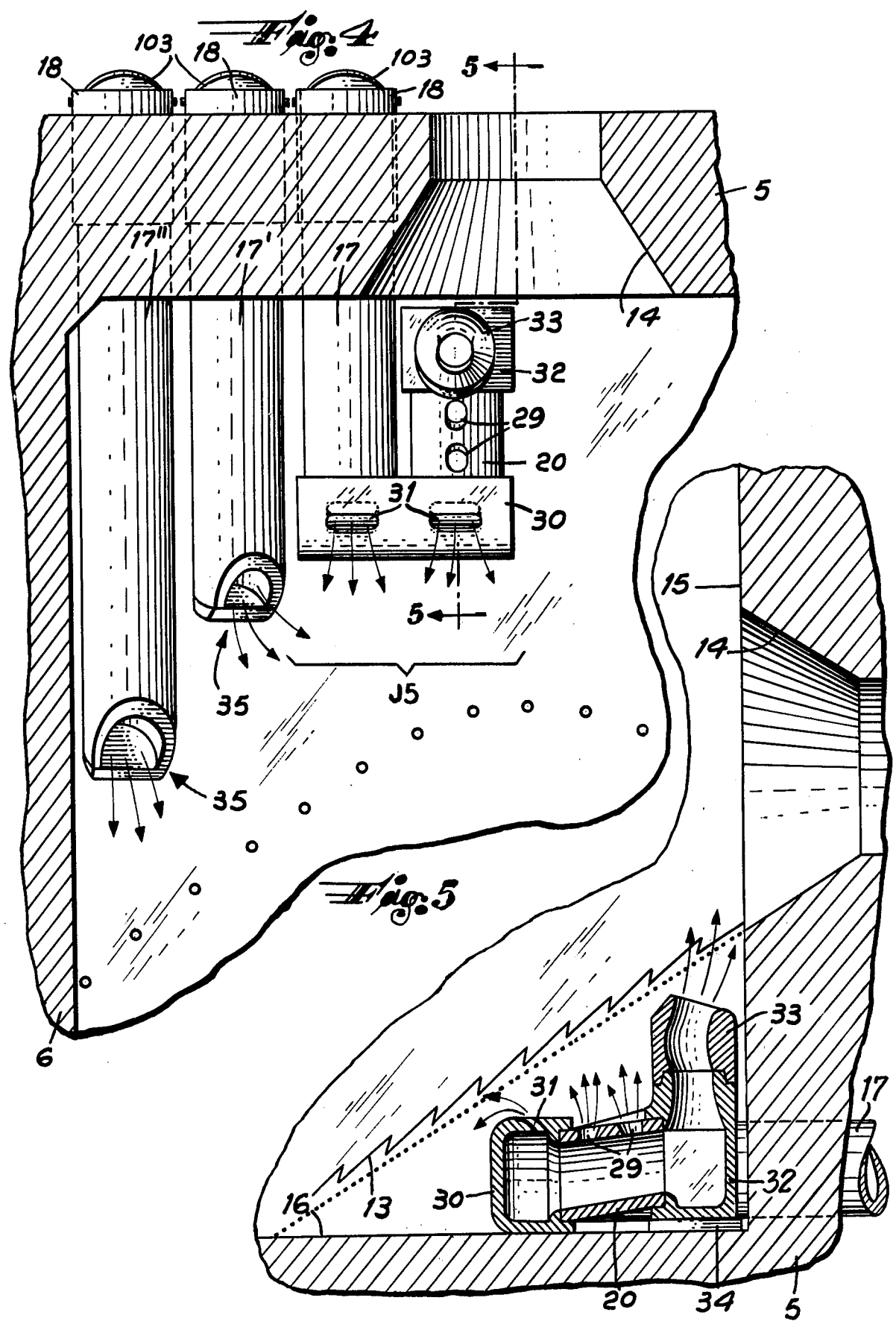

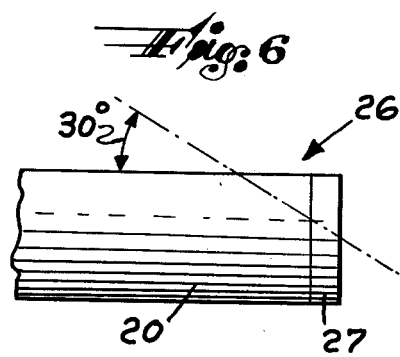
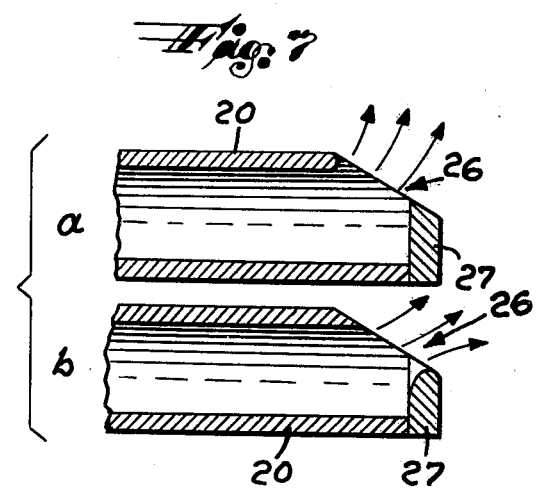
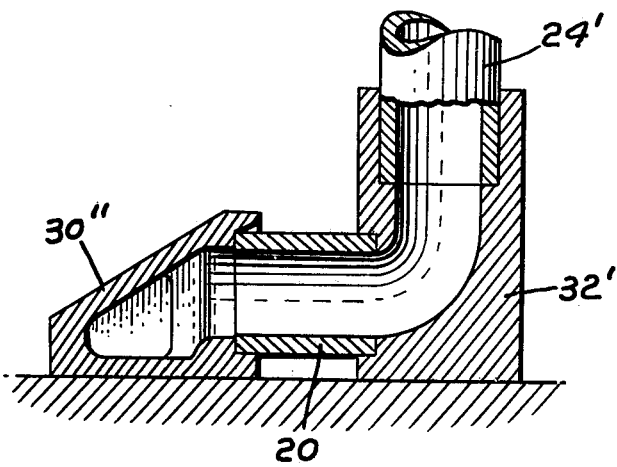
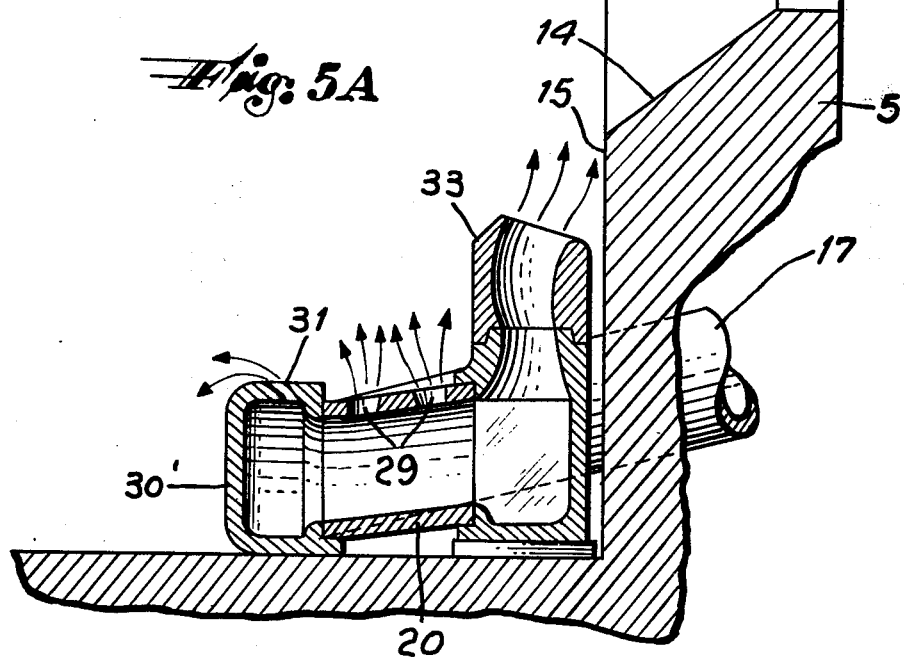

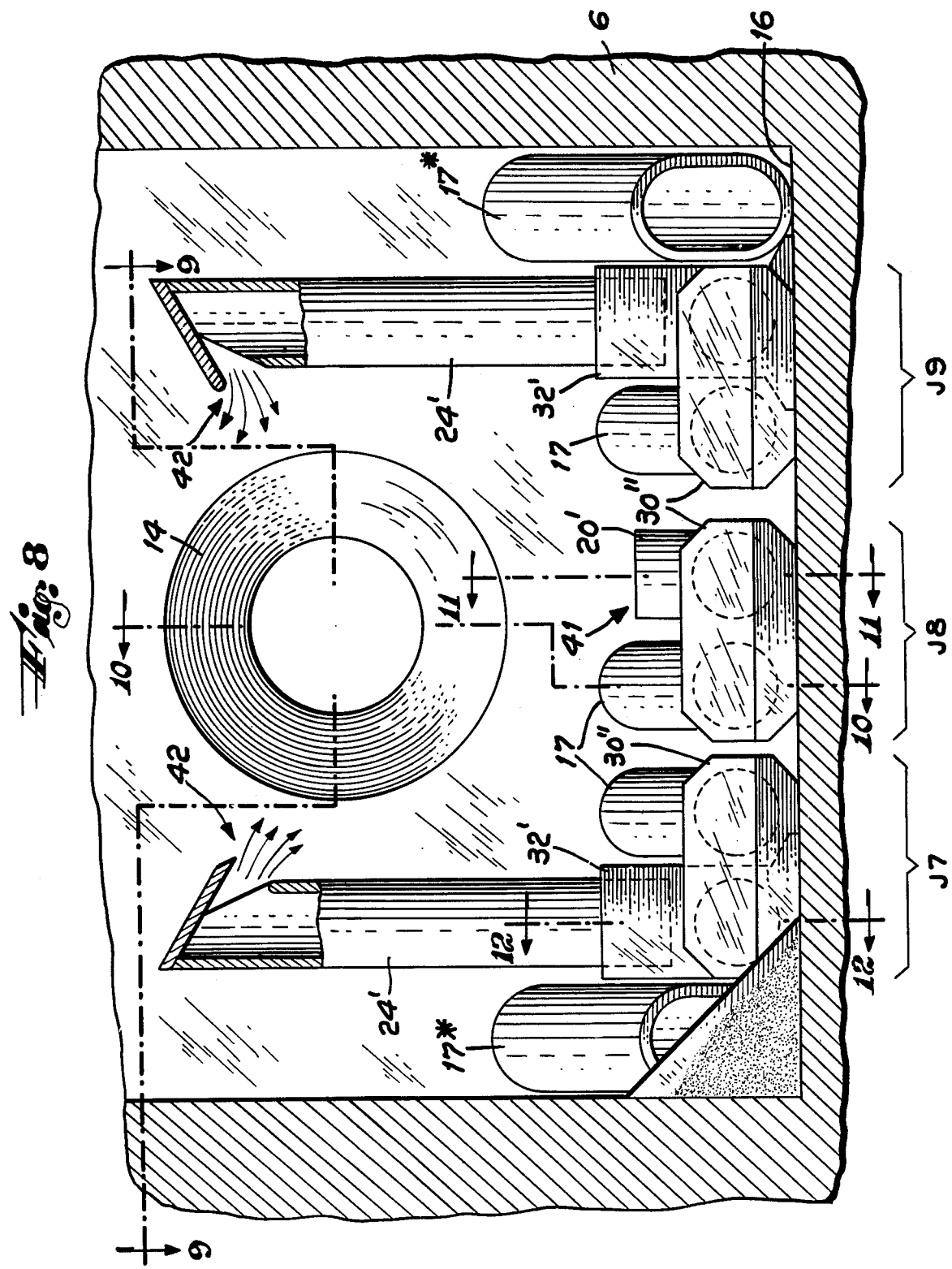

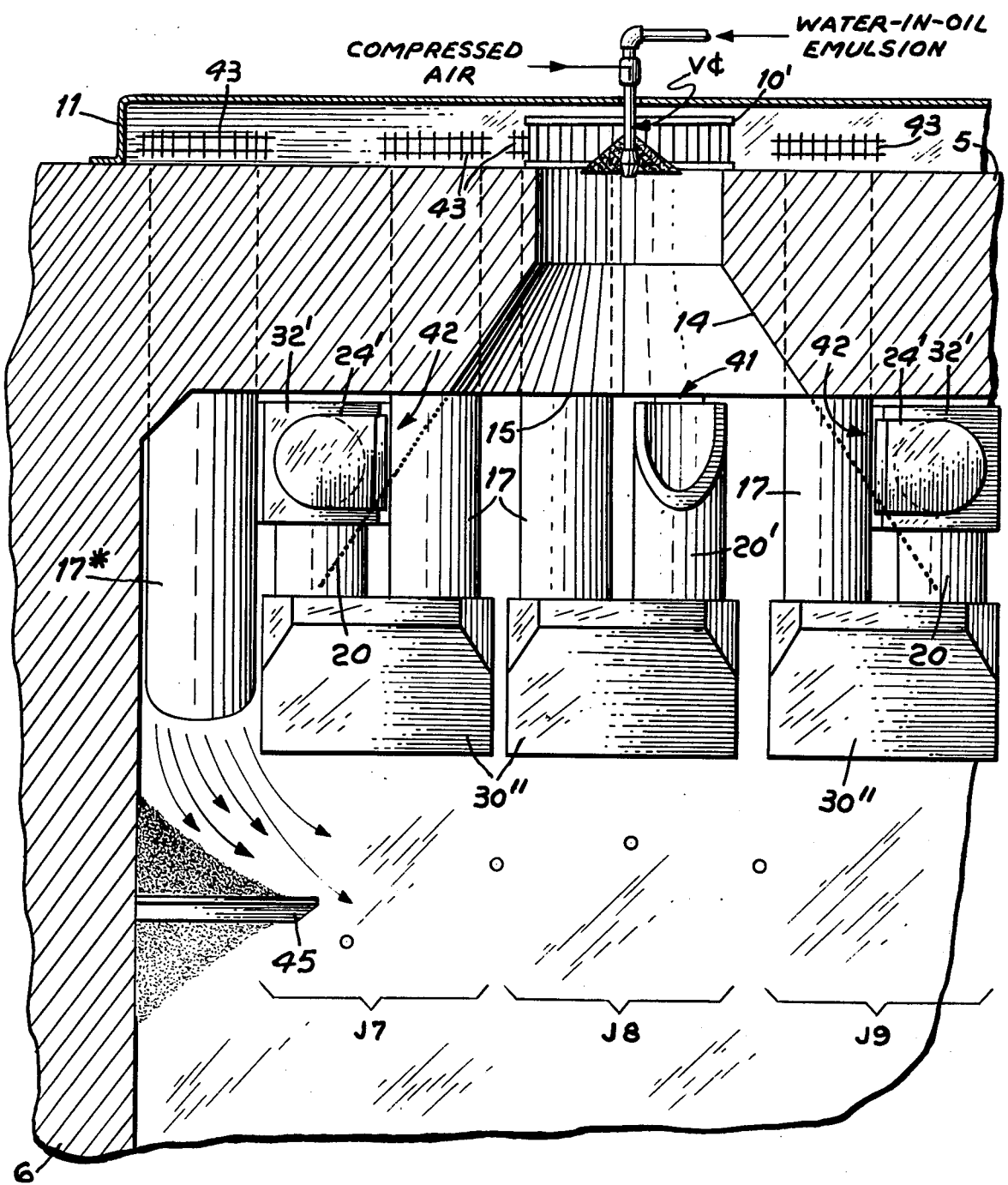

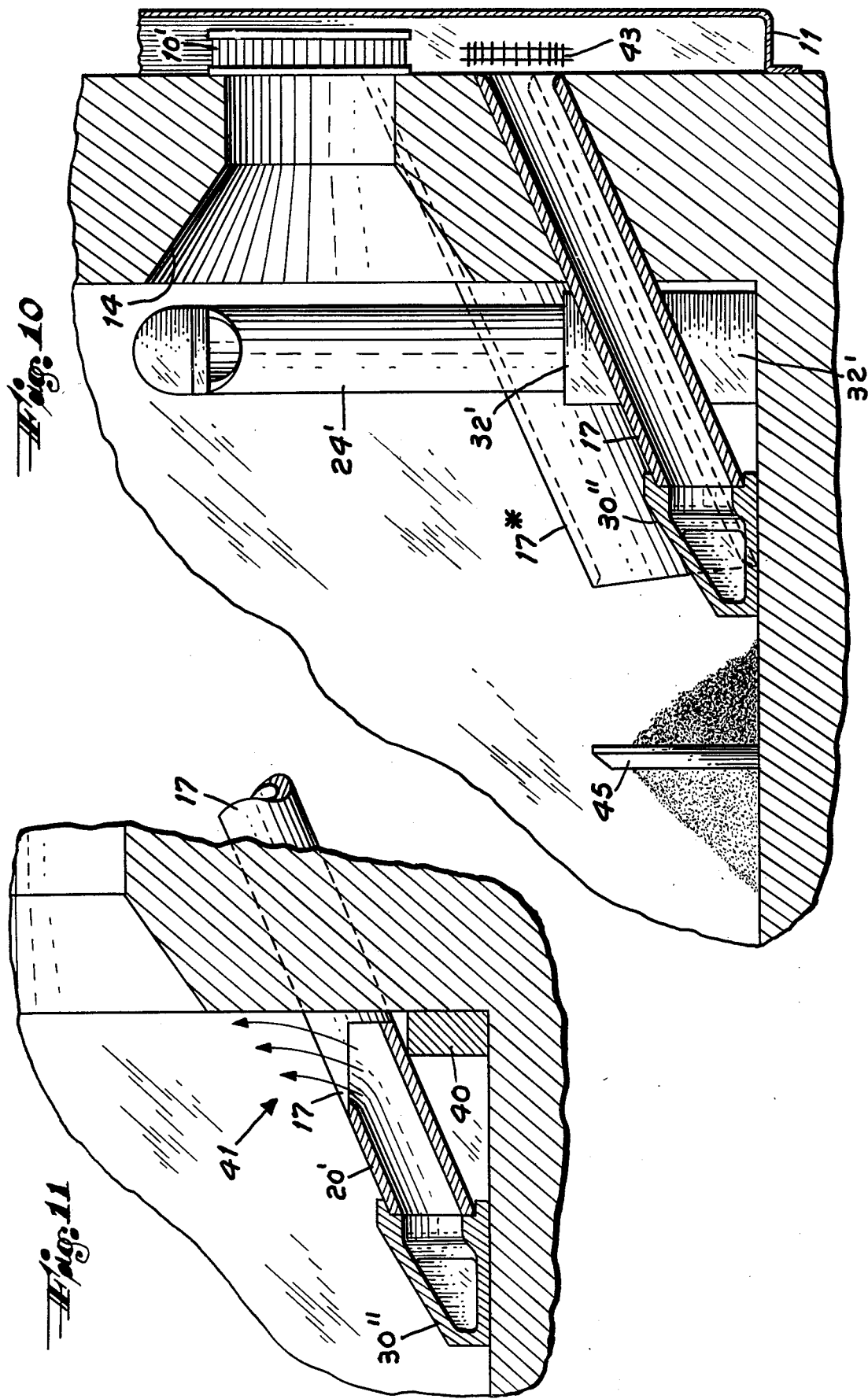

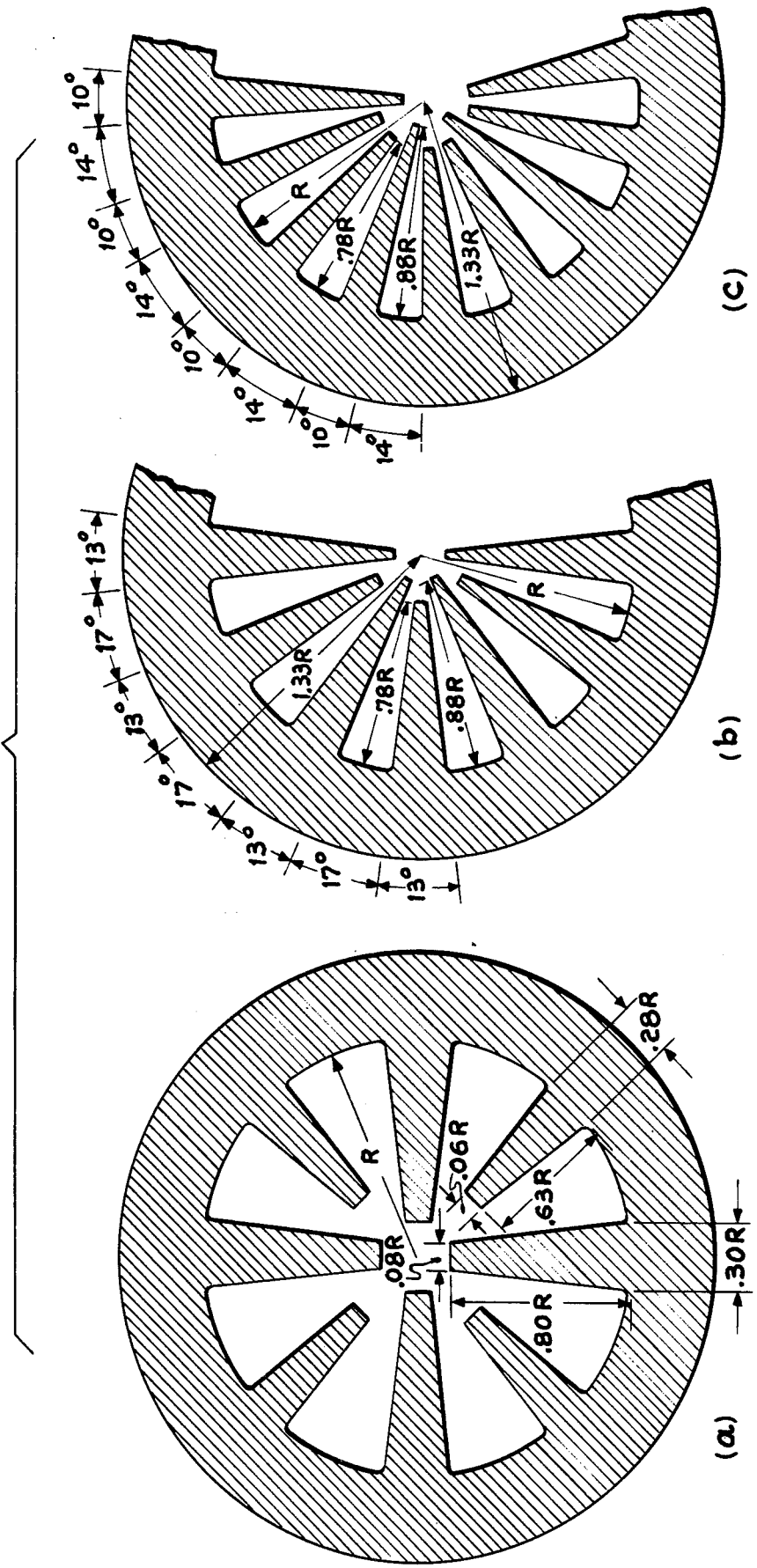

PREHEATING OF SECONDARY AIR FROM COMBUSTION CHAMBER RADIATION

BACKGROUND OF THE INVENTION

1. Field

Our invention relates to the field of condensed state burners (i.e. liquid and solid-state fuel burners) of the gun type in which the fuel is dispersed or atomized in a mist or cloud of fine particles (by use of compressed air, steam, ultrasonic agitation or other mechanical means) in a high volume, low pressure stream of primary air which is blown through an aperture into a masonry-type combustion chamber. Usually the fuel is dispersed in the primary air stream and ignited before entering the chamber in a gun-type burner, so that a flame is formed outside the chamber and blown into it; but the ignition (or both the dispersal and ignition) may occur in the chamber.

Primarily, our invention is applicable to oil-fired boilers and, secondarily, to other forms of heat producing plants fired by other liquid or solid fuels or by both at once.

Our invention relates to the preheating of secondary air fed into the combustion chamber separate from the primary air. In particular, it relates to the preheating by such air by heat drawn directly from the combustion chamber—mostly by the capture and utilization of radiant energy circulating in such combustion chamber. Our suggested specific title is "Improvements in Preheating of Secondary Air from Combustion Chamber Radiation."

2. Prior Art

To the best of our knowledge, the earliest use of radiant heat from the combustion chamber to preheat secondary air in a gun-type boiler or similar gun-type heat producing plant was achieved before 1925 by checkerwork fire-brick floors with open spaces under the fire-brick floor through which the secondary air was drawn by stack suction (later aided by a blower-pressurized plenum). Earlier preheating of primary and/or secondary air had used a heat exchanger in or under the stack (or between the combustion chamber's flue gas discharge point and the entrance to the stack) to transfer heat mostly by convection from the hot flue gas to the cold incoming air. These gave a clearly understandable and easily calculable gain in heat: Essentially, all the exchanged heat was net gain—in addition, to more subtle gains from the greater combustion efficiency due to the highly early temperature of the flame. (These subtler gains probably were not then understood or observed.)

On Oct. 25, 1966, U.S. Pat. No. 3,280,770 issued to B. F. Kwiat disclosing the use of a substantially straight baffled cast-steel pipe installed on a retrofit basis through the combustion chamber's front wall in a gun-type, oil-fired boiler. As disclosed, this depended solely on stack-induced draft for its air flow. About 1968 or 1969, Weber-Bunke Lange, Inc. of 535 Bruckner Boulevard, Bronx, N.Y. 10455 began installing similar baffled straight pipe preheaters on a retrofit basis in gun-type boilers. At first, they may have relied on stack draft for their secondary air flow, but it is certain that by 1972 they were using blower pressure to improve the air flow and using silicon carbide pipes. In 1974, they printed and distributed a brochure outlining their retrofitting services.

On Aug. 4, 1970, U.S. Pat. No. 3,522,779 issued to B. F. Kwiat disclosing a sort of internal wind box preferably of heat transmitting alloy and with an annular portion positioned adjacent to the aperture to surround the primary air stream blown through the aperture into the chamber. (As disclosed the nozzle which disperses the oil extends beyond this annular portion so that this portion does not surround the flame, but precedes it.) In one form this annular portion of the wind box has about 56 small holes aimed centripetally toward the primary air stream plus about 76 small holes discharging air rearward (in the same direction the air stream is traveling). An attempt was made to physically reduce this to practice but the alloy material used was not capable of reasonable life in the severe environment which exists in a boiler's combustion chamber. No analysis of friction headlosses or heat-transfer rates was disclosed in this patent, and we feel certain no secondary-air preheating structure generally like that disclosed could achieve q values (i.e. heat flow rates) even one quarter as great as those achieved by our structure unless his blower was designed to give very high pressures, tens of times higher than those required for our improved invention. This later Kwiat patent does show that some experts were beginning to suspect, as early as 1968, that it might be desirable to release a substantial proportion of the preheated secondary air near the base of the flame. But it also confirms that no one knew a feasible way to do this. And there was not solid theoretical nor practical evidence that this would be advantageous if achieved.

On Aug. 22, 1972, U.S. Pat. No. 3,685,946 issued to Jack Adams disclosing preheating of secondary air by a straight silicon carbide pipe (with angled vanes to give a whirling motion). This patent disclosed installing the pipe through the chamber's rear wall and blowing the preheated air in counter-flow direction, against the tip of the flame to make the flame shorter and fatter and hence supposedly hotter. The patent also showed the more usual pipe-below-the-injected-flame arrangement where the general flow direction of the preheated secondary air is roughly parallel to the general direction of the flame flow but the patentee states that the whirl rotation of this secondary air is opposite to the whirl rotation of the flame which, he says, "provides for a compression of flame front 20." This Jack Adams patent shows that the combustion industry was now aware of silicon carbide's long-lived and ultraconductive properties but gives no suggestion as to how a bulky recurved assembly of SiC components could be designed to survive in a combustion chamber (or that this would be desirable).

SUMMARY OF THE INVENTION

An improved duct structure for preheating secondary air by heat from the radiation flux circulating in a combustion chamber is J-shaped in plan view rather than straight. It extends into the chamber through its front wall but then curves around and extends forward again almost to the wall.

For long life it is made of KT silicon carbide components (a Union Carbide product which is practically non-corroding and thermally ultra-conductive, but is extremely inflexible and brittle).

To avoid breakage of this brittle structure by the thermal distortions of floor and walls, this invention proposes that the J-shaped structure be designed (like masonry) with high inherent stability. Generally it lies on the floor (parts of it may slope up or stand up from the floor but still are supported therefrom) but it is not attached to the floor. Similarly it is not attached to any wall nor does it bear on any wall (except said front wall through which it may extend slidably—or to which it may be fixed at one point if it is slidable on the floor).

It releases its hot air in a discharge region adjacent said front wall. The discharge velocity is preferably roughly aligned with $V_1$ (a unit vector from the discharge region parallel to the wall toward the burner's center-line) or with $V_2$ (a unit vector from the discharge region toward the wall and perpendicular thereto) or with some vector between these. But this discharge velocity is usually less important then the discharge region in determining the general path the air will take; and for any given discharge region, many different discharge directions will result in almost the same final path.

To minimize "flame push" (when large percentages of secondary air are fed through J-ducts to regions near the wall) it is desirable to use two discharge regions on opposite sides of the flame with their two preheated air streams directed generally toward the flame and roughly balanced in respect to at least horizontal push. Three discharge regions distributed around the burner allow rough balancing of overall push in both vertical and horizontal directions.

When vertical balancing of push is unfeasible because all discharge regions are much lower than the burner's center line for convenience or for better inherent stability (and probably even when such balancing is feasible and is achieved) we now believe that probably only a modest amount of secondary air, say 10% to 25%, should ideally be fed through J-ducts to discharge regions adjacent the front wall. Other secondary air can better (and quite cheaply) be fed through conventional straight ducts and discharged farther back in the chamber as now customary. We think this may allow a larger total amount of secondary air to be efficiently used than any 100% straight pipe system (or any 100% J-duct system, except perhaps a push-balanced one).

BRIEF DESCRIPTION OF THE DRAWINGS

FIGS. 2 and 3 are respectively rear elevation and side elevation sections taken along lines 2—2 and 3—3 of FIG. 1.

FIG. 4 is a plan view, partly in section, of a second embodiment of our invention.

FIG. 5 is a side elevational section taken along line 5—5 of FIG. 4.

FIG. 5A is a side elevational section (of a variant of said second embodiment) also taken along the same line 5—5 of FIG. 4.

FIG. 6 is a side elevation showing one way of making a certain duct orifice (used in FIG. 1 and FIG. 4).

FIG. 7 is a related pair of side elevational sections showing how the orifice of FIG. 6 can be field modified to vary its jetting direction.

FIG. 8 is a rear elevation of a third embodiment of our invention.

FIG. 9 is a plan view (partly in section along line 9—9 of FIG. 8).

FIGS. 10, 11, 12 are side elevational sections along lines 10—10, 11—11, 12—12 of FIG. 8.

FIG. 13 shows preferred proportions of internally-finned pipes of FIGS. 8—12.

DESCRIPTION OF THE PREFERRED EMBODIMENTS

Figure 1:
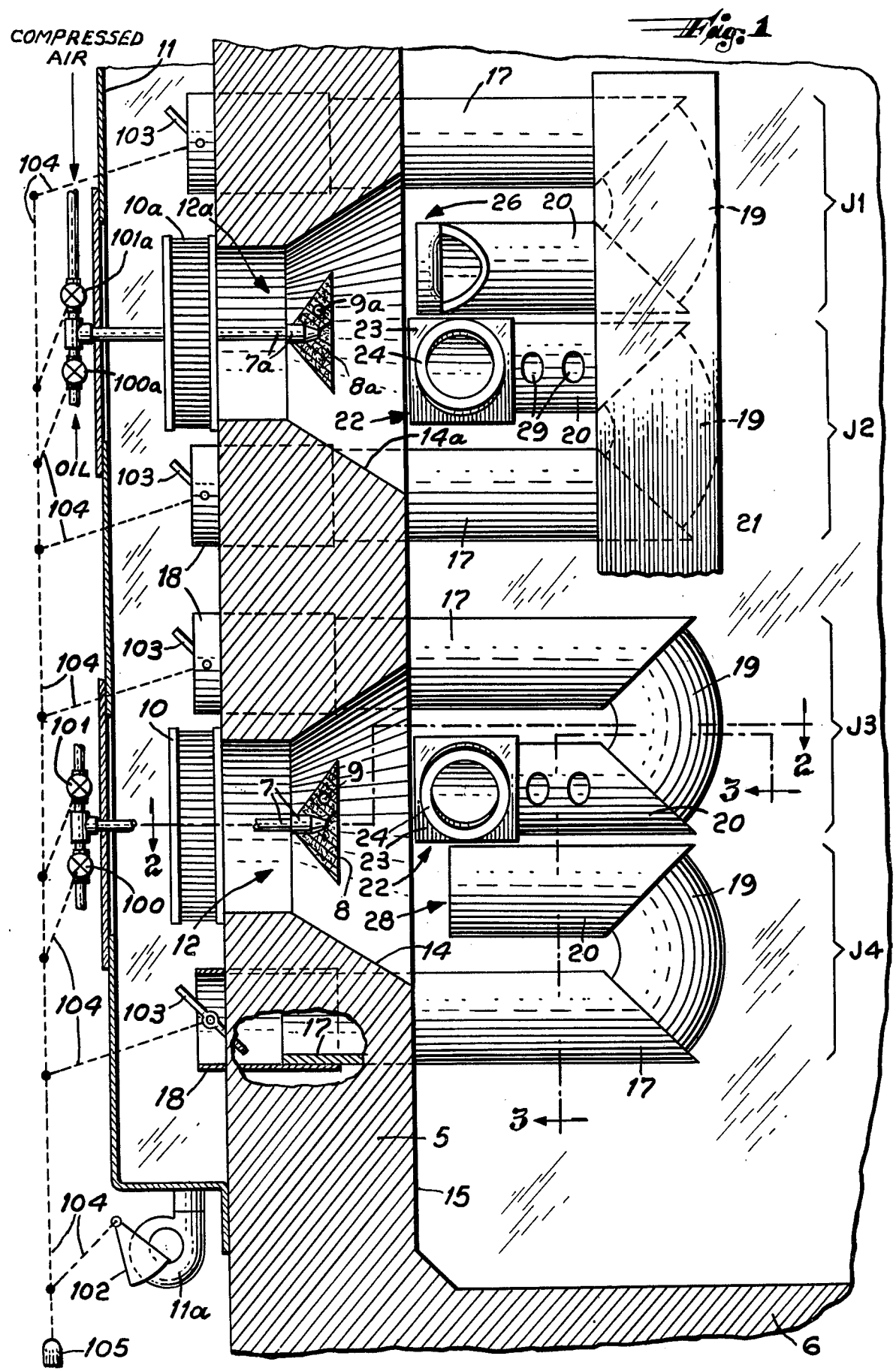
FIG. 1 is a plan view (partly in section) of a first embodiment of our invention.

FIG. 1 is a plan view of the front portion of the combustion chamber of a two-burner, oil-fired boiler plant retrofitted with an improved secondary air preheating and delivery subsystem in accordance with our invention. The combustion chamber's front wall 5 and a fragment of its right side wall 6 are shown sectioned (along a horizontal plane through the center lines of the two burners). The two burners are symbolically represented by their atomizer nozzles 7, 7a their diffusers 8, 8a (shown as containing ignitors 9, 9a) and primary air flow control means 10, 10a. These control means are preferably fully adjustable registers. Wind Box 11 is a common air plenum supplying both the primary air, for apertures 12, 12a, and also the secondary air. It is pressurized by a low-pressure, high volume blower 11a, designed for so-called "inch" pressures (e.g. 1.0" to 20" of water) but for high so-called "kilo pound" volumes of air—e.g. 1000 to 50,000 pounds per hour).

The burner apertures 12, 12a are of the usual form, cylindrical throat with so-called "Venturi" flaring portions 14, 14a (actually purely conical in shape) which extend to and end substantially at the inner face 15 of wall 5. Since it is preferred to locate over novel preheater elements safely away from the possibility of oil or flame impingement both in normal operation and during start-up, the lower limit of the conical rule-of-thumb "impingement locus" is shown in FIG. 2 (as a line of small round dots). This locus is merely an extrapolation of the conical inner surface of the Venturi flare 15 to the point where it meets the combustion chamber floor 16.

As shown in FIG. 1, four J-shaped (or unequal-legged U-shaped) secondary air duct structures J1, J2, J3, J4 are provided, two for each burner. (Rigorously only two are J-shaped, the other two being reversed Js; but, for convenience, we shall use "J-shaped" for any shape which in plan view is like an unequal-legged block letter U (of the usual round bottom style or squared style or intermediate style) regardless of whether the left leg or the right one is the larger. (When referring to duct structures, the shape signifies the shape of the duct center line.)

The pipes and elbows used to assemble these J-shaped secondary air duct structures are made of "KT silicon carbide", a self-bonded silicon carbide material sold by Carborundum Division of Union Carbide Corporation. This is a very refractory material and long-lived—many years life at 2000°-2500° F. in contact with air (or with most combustion gases). It may properly be called "ultraconductive" since it has higher thermal conductivity than cast iron, higher than any other feasible metal which could endure for even three months under these conditions. Its thermal conductivity is much higher than any firebrick or refractory tile, probably even higher than graphite brick at these temperatures (but graphite oxidizes fairly rapidly in air at 2500° F. so that its conductivity is known only up to 1292° F.).

Unfortunately, however, KT silicon carbide is very inelastic and brittle and we propose that structures made of this be designed as if made of a ceramic or a brick or masonry material. Also, we are not yet confident of the reliability of the field-bonded joints we can make in situ by using the recommended Carbofrax cement (a ceramic bonded silicon carbide material also sold by Carborundum Division of Union Carbide) and firing it by a controlled preliminary operation of the oil-burning boiler or other heat-producing plant in which our secondary air subsystem is being installed.

The long "entrance legs" 17 of all four J-shaped structures extend from the wind box 11 through wall 5 into the combustion chamber, and continue rearward (essentially on the floor of this chamber) for a substantial distance as shown in FIG. 1. The main constraint which limits such rearward extension along the floor of the chamber is the undesirability of protruding through the impingement locus which lies slightly below the bottom of flame 13 as shown in FIG. 2.

The in-chamber portion of each entrance leg 17 (as well as the rear third of the portion inside wall 5) is simply a thick-walled cast silicon carbide pipe of nominal six inch diameter (6" ID×8" OD). But the inlet end 18 which extends into the wind box 11 (as well as the front third of the portion in wall 5) is a thinner-walled sleeve of stainless steel tubing whose inner diameter is slightly larger than the silicon carbide pipe's outer diameter. (The central third of the portion in wall 5 is a telescoping portion where both the steel sleeve and the silicon carbide pipe overlap.) The telescopic arrangement for entrance leg 17, of J-duct J4 is clearly shown in FIG. 1, the whole sleeve 18 and the cooperating portion of pipe 17 being sectioned along a horizontal plane through their center lines (with a part of the intervening material of wall 5 broken away to show these). The four sleeves 18 are fixed to the wall, but the four pipes 17 are free to slide inside these sleeves to provide stress relief for the brittle J-ducts if wall 5 moves with respect to the floor 16 or if the floor's expansion differs from that of the SiC ducts.

Although these telescopic stress-relief arrangements were actually provided in our first experimental installation to be completely sure of long life for this (and hence are disclosed in FIGS. 1-3 which corresponds generally thereto), we believe they could be omitted—at least if casting 21 (hereafter described) were separated into four parts, one for each J-duct. It will be seen from the description which follows that the J ducts merely rest on the floor, but are not attached thereto; and they could slide along the floor slightly to relieve large stresses.

The turnarounds, or transverse duct legs, of all four J-ducts are alike. All are compromises between smoothness of turn (to minimize frictional head loss in the flowing air) and close-coupling of the turnaround so that the two pipes representing the two legs of the J lie close together (to conserve space).

Consider the turnaround for J1. This uses 90° elbow 19 and two 45° miters to achieve a fairly smooth 180° turn with less than 0.4 D separation between the longer entrance pipe 17 and the shorter return pipe 20 (D being the outer diameter of leg 17). Since a 45° miter on a pipe of 8" OD and 6" ID (like entrance leg 17 or return leg 20) gives an elliptic opening 8.5" long by 6" wide, elbow 19 has a compromise diameter of 9" O.D. and 7" ID.

The two miter joints connecting elbow 19 to legs 17 and 20 of J1 were cemented in situ—while also simultaneously cementing the six corresponding joints of J2, J3, and J4—by casting one long box-like mass 21 of Carbofrax around all these eight miter joints at once (in a wooden form like a form for concrete), tamping it well, troweling like very dry concrete, letting it set to develop an adequate temporary strength and then removing the forms and heat transforming the cement by one hour of operation of the boiler plant. With this heavy integral casting 21 encasing all four elbows and all eight miter joints, we could be confident that all elements would remain fixed in their relative positions even if some of the bonds to the eight pipe 17 and 20 did not develop full factory-fired bond strength. But shifts of position of the whole casting on the floor to relieve large thermal stresses would still be possible.

Duct legs 20 of J2 and J3 (the short return legs of these Js) terminate in upturns 22 (i.e. vertical elbows) encased in nearly cubic Carbofrax castings 23. The low riser ducts 24 which extend up to within two inches from the impingement line (which practically coincides with the flame envelope 18 at this position) are actually integral with the upturn unit 22. In FIG. 2, the encasing casting is shown partly broken away, so the upturn can be seen to be a simple square miter joint, very slightly inclined from true vertical in order to aim at the center of the flame. These two upturn-with-riser-duct units are encased in the cement by casting this in wooden forms, and these castings are fired at the same time as the common encasement 21 of the four turnarounds. (Refractory shim 25 holds the duct leg 22 level during the first hardening of the cement.)

Return duct legs 20 of J1 and J4 have much simpler and cheaper discharge terminations than the upturn-with-riser-duct terminations just described for J2 and J3. The discharge arrangement 26 which FIG. 1 shows as terminating return leg 20 of J1 is best described by reference to FIGS. 6 and 7. These show one possible way of making such termination. As shown in FIG. 6, the round pipe of return leg 20 is first capped with a two-inch thick disc 27 of the same O.D.—preferably factory bonded to the pipe before it is sold. (Or exactly the same final shape with, perhaps, easier bonding and greater final strength can be produced by using a two-inch-longer pipe plugged with a well-fitting, two inch long, plug—also factory built and sold). As shown in FIG. 6, such capped (or plugged) pipe can later be sawed off at any suitable angle to form orifice 26 (sawing is one operation which can be well performed in the field if a radial arm saw with suitable clamping fixtures is used). The resulting orifice 26 can then be "trimmed" (i.e. further adjusted in angle) by sandblasting to round either the knife edge left on the pipe by the sawing (as in FIG. 7a) or that left on the cap (as in FIG. 7b). The termination 26 shown in the embodiment of FIG. 1 is a compromise between the 7a and 7b forms, having both sharp edges heavily rounded. This gives about the same discharge direction as the 7a form, (say roughly 60°±15° with respect to the pipe so the mean discharge direction is roughly 30° from parallel to wall 5). There is a strong upward component in the discharge and its impingement upon face 15 is sufficiently near grazing to make it cling to the wall, so the final meeting of this flow with the existing flame will be vigorous enough to mix quickly with the flame.

The termination 28 of the return leg 20 of J4 is the simplest and cheapest of all, being merely a squarely-sawed-off open end of the pipe 20 which is aimed at the hot face 15 and spaced about half a pipe diameter away from this face. It is definitely not aimed at the base of the flame 18.

This very crude discharge opening 28 which terminates the discharge leg of J4 is the simplest and cheapest and has the least flow resistance. Because it is so simple, it might be thought to perform merely the function of the prior art straight pipes (preheat the air and deliver it somewhere in the chamber where it will eventually be entrained by the flame). Even this would, of course, be useful and would represent an improvement over the art because of the higher temperature rises (achievable without exorbitant headloss) which are attained by the longer flow paths of J-shaped preheating duct structures. But we believe that termination 28 actually performs much better than this. We believe that a substantial fraction (we estimate about 20% to 40%) of all the air discharged through this open pipe end is somehow caused to flow along a path which meets the flame near its base (probably less than four or at most seven tenths of an aperture diameter from face 15). Two factors, we think account for this:

1. The tendency for flowing air to cling to and follow a planar or smoothly curving surface if it once gets tangent to it.
2. The presence of a localized layer of strong steady centripetal flow toward each of the two flame bases, along the face of the surrounding wall.

We theorize that these centripetal flow layers arise because each burner's out rushing flow of burning fuel and primary air through its Venturi mouth 14 or 14a, continuously entrains and carries away the immediately contiguous conical sheath of ambient gas; and the consequent suction pulls other ambient gases inward along the wall face to replace the entrained gas. Further downstream, it seems certain that large-scale rolling turbulence has become established, so that inward and outward flows are randomly interspersed, with no steady flow layers. But adjacent to the front wall, we believe, a shallow layer (say 0.1 to 0.3 aperture diameters thick) of steady strong centripetal flow can be detected out to a radical distance of something like 0.4 to 0.7 aperture diameters beyond the conical mouth of the flaring aperture. (In the foregoing discussion, where dimensions are given in terms of aperture diameter, the maximum or exit diameter is meant.) We have not yet been able to verify this hypothesis and do not wish to be bound to this or any other theory as to why discharges of preheated secondary air in the vicinity of the front wall seem to supply much of (or most of) their air in what we call the "intended direction" $V_1$ (i.e. centripetally along face 15) toward the base of the flame, whether aimed in what we call the "neutral" direction $V_2$ (perpendicularly at this face) or in some intermediate direction between $V_1$ and $V_2$. But observations of the flame while turning on and off the flow through J4 by means of its damper 103, make us certain that this does happen. If the discharge location is reasonably close to the burner aperture and within 0.1 to 0.4 aperture diameters of the wall and the discharge velocity is below 50 ft./second (desirable to minimize flame push) then the location is more influential than the discharge direction in determining the path which the discharged air will take.

One factor we consider important in the design of our J ducts is to design them like masonry, not like metal duct structures. As far as practicable, the J-duct structures are supported by the floor with freedom to shift slightly as needed to relieve strains and with no ties to walls unless unavoidable.

Although the four J subsystems of FIG. 1, 2 and 3 would in normal parlance be said to be lying "on the floor", study of FIGS. 2 and 3 show that only the fittings—i.e. the cement-enveloped U-turn assemblies and upturn miter joints—touch the floor. The lower surfaces of the pipes themselves are about ⅛ diameter above floor level. This is very desirable, because it eliminates heat flow from the bottom of the pipe into the floor and actually allows the bottom of the pipe to receive some radiant heat.

An even greater elevation of the piping (and of the fittings too) would presumably be somewhat more efficient. The expression "essentially on the floor" as used hereafter, shall, therefore, include not only the exact height illustrated in FIG. 2 (with the fittings touching the floor and the bottom of the pipe about 0.125D inches above it—D being the diameter in inches of the pipe) but shall also include slight variants of this height such that the lower surface of the main straight duct portions is between 0 and 0.6D inches above floor level and the lowest portions of the fittings are between 0.3D inches below and 0.55D inches above such level. (If the pipe is round, D is its outside diameter in inches as above indicated; if it has some other form, D is its vertical dimension.)

As FIG. 2 shows, the rear-most portion of each J—the transverse leg or U-turn assembly—is already close to the impingement envelope, so that raising this transverse portion would require shortening the whole J structure—not desirable. Thus, if a J structure is to be raised slightly to improve its heat transfer effectiveness, only its forward portion should be raised, while its rear portion should remain about as low as shown in the figure, or could even be lowered a little to permit a longer J.

If only one or two fittings extend below floor level, it is not too hard to replace a few refractory bricks with thinner but better tiles (and perhaps a number of underlying insulation blocks with like-size, but more efficient ones) thus, creating one or two small-area shallow depressions with little or no loss in thermal insulation or floor life. In a case of new construction or a case where the floor must be all reset anyway, it might even be worthwhile to sink small portions of the piping adjacent to the transverse leg as deep as 0.2D into the floor and to sink some portions of the transverse fittings as deep as 0.4D into the floor (and the phrase "essentially on the floor" is to be understood as including such deeper down-sinkings at the transverse end of the J). But no down-sinking of the piping below 0.2D is recommended.

By rough calculation, we estimate that even the first model of our J-type preheaters is giving higher temperature air discharges (mostly meeting the flame near its base) and is achieving greater total preheat feedback than could be practically achieved with any of the prior art systems we know of.

Just as in conventional systems using straight-pipe secondary-air preheaters, the modulation or turn-down of the primary and secondary air flows should be ganged very nonlinearly so that the secondary air-flows fall off much more rapidly (percentage wise) than the primary air-flows as the firing rate is decreased from its maximum rate.

The flow of fuel oil to nozzles 7, 7a (from a constant-pressure supply—not shown) is controlled by variable metering valves 100 and 100a, the flow of compressed air to atomize this, is controlled by similar valves 101 and 101a.

As the oil flows through 100, 100a is reduced, the total flow of low pressure air (primary plus secondary) should decrease in almost this same proportion. Most of this reduction is achieved by lowering the flow into the blower 11a by input-restricting means, 102, thus lowering the pressure in plenum 11. But at the same time the butter-fly type dampers 103 provided on sleeves 18 are also ganged for modulation toward closed position as input restriction means 102 reduces the blower input. Thus as the total low-pressure air flow is decreased the secondary air flows are much more sharply decreased. The control network, or "tree", 104 (shown as a dashed line branching to valves 100, 100a, 101, 101a, air restriction means 102, and the four dampers 103) symbolically represents any of the well-known nonlinearly proportional ganging arrangements usually used in the heating industry for several separate fluid streams (e.g. low and high pressure air, plus liquid fuel).

Based on our experiments with the model, which corresponds generally to FIGS. 1–3, we now tentatively recommend that only a modest percentage (say 10% to 20%, or possibly 25%) of the total low-pressure air requirements for a given firing rate should be supplied by air preheated in J-ducts and discharged in discharge regions adjacent the front wall. And we strongly recommend that all this modest amount of air which is so preheated and so discharged should be heated as hot as possible and discharged near the flame with its discharge direction aimed at the flame base. And we tentatively recommend that another comparable amount of preheated secondary air be discharged in a more downstream portion of the combustion region to mix with the flame in a later stage of its burning.

The reason for these recommendations is that preheated air in all conventional straight baffled pipes (and even in J-duct system if special precautions are not taken) is much cooler than generally believed. Thus too much of it too early chills an immature flame which has not yet attained enough heat to stand much chilling.

Measuring the temperature of air at temperatures like 300° to 800° F. inside a black-body container having a radiation-equilibrium temperature of about 2000°–2300° F. is a very difficult engineering task and the direct insertion of temperature sensors into the body (even if shielded) will give extremely misleading results. Even a sampling aspirator requires very special design and utilization to give meaningful readings. Thus many honest but erroneous reports of 1200° F. or higher preheat temperatures have been circulated when the actual air temperature was well below 600° F.

Preheated secondary air even at 550° F. should be though of as cool air. It is much better than cold, primary air at 50° F. (except that it arrives too late, so cold primary air has heretofore had to be accepted and used by the flame for the first 20 milliseconds of the flame's life). Now with J-ducts the preheated air can mix with the flame after only about 10 milliseconds, so it should be possible to start the flame with part of the usual "cold" primary air omitted, replacing this omitted "cold" air at the 10th millisecond by only as much of the cool air as is needed to supply oxygen from the 10th to the 20th millisecond. For the post-20-millisecond oxygen needs, cool air should be dishcarged into the flame at about 20 milliseconds. If this cool air (for the post-20-millisecond period) is discharged into the flame too early (along with the air needed for the 10th to 20th millisecond) it unnecessarily chills the flame too early. (These numbers are just picked out of the air for the purpose of providing a specific (hence easier to understand) numerical explanation of a tricky point which is generally misunderstood. Both the erroneous claims about 1200° preheat temperatures, and the natural tendency to think of 550° air (or 800° air) as being "hot" (even if it seems "chilly" to the not-quite-mature flame whose temperature is well above 1000°), both of these are common causes of confusion.

We tentatively recommend that to attain adequately high preheat temperatures the J-ducts (and also the straight pipes) should preferably be initially big enough so that mean air flow velocity through them (without fins) would be of the order of 60 ft./sec., or less, and that they then should be very densely finned to increase their cross-sectional internal periphery, P, by a factor of 3 or 4 while reducing their cross-sectional open area, A, by a factor of 0.6 to 0.4.

The advantage of internal lengthwise fins over baffles is hard to prove. Baffled pipes can yield the same preheat temperatures if a sufficient number of deep enough baffles are used; the only question is whether such baffles cause more headloss than an internally finned pipe with equivalent heat transfer. We believe that they do, and our recommendations are based on such belief.

We have recently begun to recognize the possibility that a mix of J-duct preheaters and straight-pipe preheaters may give a more suitably-timed progressive secondary-air feed than either a 100% J-duct or a 100% straight pipe preheater subsystem. Thus the embodiment of FIGS. 4–5 (as well as the variant of FIGS. 4–5a) shows straight round pipes which are understood to be either transversely baffled, or preferably internally finned with fairly thick high conductivity lengthwise fins of silicon carbide. FIG. 13 shows proportions of three round finned pipes, with calculations illustrating how P and A for the finned pipe compare with the corresponding P and A for the unfinned ones. These proportions also emphasize the important point that for fast air flows and high heat transfer rates very massive fins are necessary to carry the heat without excessive temperature drop, even with ultraconductive material such as SiC.

FIGS. 8–12 show straight oval pipes of race track cross section which also are preferably internally finned. It will be obvious to experts in the art how each pattern of FIG. 13 can be adapted to such oval pipe, by splitting such pattern into two halves—for the two semicircular portions of the oval—and interpolating a few horizontally-extending fins with lengths like those of the pattern's longer fins, and with base and tip thicknesses and mean inter-fin spacings reasonably similar to those of such pattern.

FIGS. 4 and 5 show a secondary air preheating and delivery subsystem which has two J-duct structures and four straight pipes. Since the subsystem is symmetrical, only the left half is shown in FIG. 4, including just one J-duct structure J5 with entrance and return legs 17 and 20 as in FIG. 1. The turnaround function for these J ducts is performed—without miters—by a specially designed and factory produced transverse-duct fitting or turnaround box 30 which is stream-lined as far as possible while still keeping the necessary compactness. It has fairing-in beads covering the pipe ends to blend them smoothly into the transverse duct, see FIG. 5. The turnaround box 30 is designed to be very compact as seen in FIG. 5. It has two long slits 31 narrow enough to discharge only about 20% of the air received from entrance leg 17. These slits are inclined as best shown in FIG. 5, so the air will exit tangent to the surface and spread out over the front of box 30, thereby slightly deflecting the air-and-oil stream during start-up; this permits the box to be placed closer to the impingement locus.

The lower limit of the rule-of-thumb impingement locus is shown in FIG. 5 as a line of small circular dots just as in FIG. 2. But in FIG. 4 the "hyperbolic intersection trace" where the conic impingement locus meets the floor is also roughly outlined by eleven small circles in order to facilitate appreciation of the stringent space limitations imposed thereby.

In the system of FIGS. 1–3, the double burner installation was illustrated in a fairly large combustion chamber with the center lines of the burner apertures 40 inches above its floor, and the bottom of the flare cone 14 sloping down only about 30°. But in the usual medium-large boiler of today, the combustion chamber is likely to be only 60 inches wide with the center line of the aperture only 30 inches above the floor and with the conical aperture flare sloping down at 35°. FIGS. 4 and 5 represent a fairly roomy situation, since their combustion chamber is 80 inches wide with its aperture 40 inches above the floor. But the Venturi flare tile FIGS. 4 and 5 does slope down at 35° instead of 30° so that the hyperbolic intersection trace comes within 36" from hot face 15. And even this little difference makes it hard to install a subsystem using six-inch nominal pipe (8 inches OD and 6 inches ID). Even the very compact turnaround box 30 and the equally compact upturn box 32 leave only enough space for 9½ inch length of skew-cut pipe (7.5 inches of exposed pipe) for return leg 20.

This leg 20 has medium-large holes 29 sized to release about 25% of the remaining air to meet flame 18 in a region about 0.3 to 0.6 aperture diameters from face 15 of wall 5. Thus after the discharges of slots 31 and holes 29, only about 60% of the air delivered by entrance leg 17 is turned up by upturn box 32 and delivered to nozzle 33 for discharge.

Upturn box 32 and nozzle 33 are carefully streamlined to hold their combined friction headloss below 25 pipe diameters, and to reduce the cross section area smoothly for accommodating the loss of air through slots 31 and holes 29, plus a little further reduction to speed up the air before discharge. The nozzle is designed so that its base fits snugly but rotatably over the stepped round tip of upturn 32, and its discharge stream is at an angle of about 15° or 20° with respect to its axis of rotation around said round top. Thus by rotating this nozzle one swings its stream conically, and thus can vary its upstream/downstream tilt (i.e. its inclination toward wall 5) from +15° to −15°. If necessary to prevent rotation of the nozzle by high speed air flows a flexible refractory band may be wrapped around the rotating joint and clamped during testing. The whole upturn and nozzle may also be swung about an axis parallel to the aperture center line to remove undesired in/out tilt components (incidentally achieved while adjusting the upstream/downstream tilt) and to impart clockwise or counterclockwise whirl to the flame. When adjustments have been finalized, the nozzle 33 is cemented to upturn 32. This upturn stands on two equal shims 34 (one not visible) which can be replaced by unequal ones to tilt the upturn one way or the other about an axis parallel to the aperture center line (preferably leg 20 is cemented to upturn 32 to stabilize it against tilting to or from the wall but is not cemented to turnaround 30 until adjustments are finalized).

Two straight pipes 17', 17", with transverse, or preferably lengthwise internal fins, lie essentially on the floor near right wall 6. Their discharge openings 35 are similar to those of FIGS. 6 and 7 except that before capping, the pipes are cut obliquely at a 45° angle instead of a 90° square cut and capped with an elliptical plate which is cemented and fired. Then the capped pipe is cut in the field at a suitable angle (say 30° the other way) and the sharp edge on the pipe sandblasted to round it heavily, while the one on the cap is sharpened, i.e. sandblasted so it slants still more sharply back, to avoid any Coanda effect. These discharge terminations can be wholly field built, but in view of the inconvenience of field-firing cemented joints, the obliquely capped pipes are preferably sold prefabricated, and the sawing and sandblasting of these to form a discharge orifice of a desired size and discharge direction is done in the field.

The straight pipes 17' and 17" and the entrance and return leg 17 and 20 of J5 are all understood to be internally finned like FIG. 13(a). Near the discharge ends of 17' and 17" the fins are broken away and sandblasted smooth so as not to interfere with the discharge. Similarly the fin would would be in line with holes 29 in return leg has been broken away and sanded smooth.

FIGS. 4 and 5a taken together show a variant of the just-described embodiment represented by FIGS. 4 and 5. Entrance leg 17 of J5 slopes down from an elevated telescropic strain-relief arrangement. The sloping position of pipe 17 is shown in FIG. 5a, but the telescopic arrangement including pipe 17 fitting into sleeve 18 is shown only in FIG. 4. The turnaround 30' of FIG. 5a has been slightly modified by eliminating the top halves of the flanges of both the so-called "bell mouths" which surrounded pipes 17 and 20 in FIGS. 4 and 5. Now in the embodiment of FIGS. 4 and 5a the lower halves of these bell mouths still surround these pipes to facilitate cementing but the upper halves have the flanges eliminated so that angled entrance pipes will fit in properly. Since 32 is intended to be used for both normal and mirror-image J ducts, either bell mouth might be used for the entrance pipe and, therefore, both bell mouths are modified.

FIGS. 8–12 show another embodiment of our invention, especially intended for the many boilers having a 60 inch wide combustion chamber with a 30 inch high burner center line. To fit our invention therein, it is preferred to use a nominal four inch pipe (actually 5.5"OD×4.12"ID) instead of the nominal six inch one (8"OD×6"ID) which was used in FIGS. 1–3 and FIGS. 4, 5 and 5a. The embodiment of FIGS. 8–12 shows compact fittings for such four inch pipes. Also, since it is one of our later designs, this embodiment includes some things learned from earlier errors. It performs one new function we have not previously attempted. It projects two of its air streams most horizontally toward the flame, one in each direction so their horizontal momentums balance each other to produce negligible overall asymmetric deflection of the flame (to the left or to the right). Such plan-wise balanced, predominately-horizontal streams require very tall thin riser ducts, near enough to the wall and far enough from the center line so that they can extend up between the wall and the impingement cone to a level of at least 70% of center line height (or much higher in the case of the three-jet system shown in these figures).

FIG. 8 is an elevation as viewed from the rear of the combustion chamber looking toward the front wall (the side walls and floor being sectioned along a vertical plane behind the rear-most part of the previously mentioned hyperbolic intersection trace). FIG. 9 is a partial plan view sectioned along line 9—9 of FIG. 8. The equipment shown in FIG. 9 is not fully symmetric, so it would not suffice if this figure showed only one half the plan view, ending at the center line. But everything further from the center line than the extreme left and right edges of the aperture cone's flaring portion 14 is fully symmetric about the center line. FIGS. 10, 11 and 12 are fragmentary side elevational sections along lines 10—10, 11—11 and 12—12 of FIG. 8.

FIGS. 9, 10 and 11 show that all three entrance legs 17 of the J ducts, J7, J8 and J9 slant down from a higher point in wind box 11 to the turnaround boxes 30″ on the floor; as clearly seen in FIGS. 10 and 11 these slopes are all at about 30° down angle.

The two straight pipes 17* also slant down parallel to these entrance pipes. These are oval to provide oversized gross duct capacity, but are very densely finned (by internal lengthwise fins, not shown) to reduce their open area A to about 50% of the unfinned value while increasing their internal periphery P to about 350% of the unfinned value. See FIG. 13 for suitable fin patterns. Instead of providing directional discharge orifices, the floor-wall corners of the chamber are provided with triangular deflector vanes 34 (as large as possible without actual trouble-some impingement). These are initially held in place by piles of firebrick. Then when final size is settled they are cemented as shown.

The return legs 20 of J7 and J9 lie essentially on the floor as suggested by FIG. 8 and confirmed by FIG. 12. But return leg 20′ of J8 slopes up parallel to the entrance legs 17 and extends to about a third of an inch from face 15 of front wall 5. It rests slidably on a block 40, and the crack between face 15a and the end of return leg 20 is filled with fibrous or soft refractory material (omitted for clarity) to exclude debris which might wedge between them and cause enormous thermal stresses. The obliquely sawed-off end of this return leg 20 has its sharp edge cut back by sandblasting and rounded on the portion facing the pipe's inside. However, this sandblasted surface must not blend into the outer surface but must meet the unsanded original outer surface with a definite sharp corner of 45° to 60° angle to avoid Coanda clinging which would spread out the discharge stream from this simple but very effective discharge arrangement.

The two upturn boxes 32″ are true fittings—not masked mitered joints like upturn arrangements 22 of FIG. 1. They are designed to accept two nominal four-inch pipes, instead of one pipe and one adjustable nozzle like upturn boxes 32 of FIGS. 4, 5 and 5a. They are as streamlined as possible while still providing an upturn plus recessed pipe receiving sockets for the 5.5″ OD pipes all in 7.5 inches of length.

The turnaround boxes are also as streamlined as possible with such close coupling. In order to get one fairly sweeping curve instead of two shorter ones, the rear of each box was tapered so it could extend far back under the impingement locus, and the duct in this fitting was gradually constricted to about 80% of its normal area (i.e. to 80% of the interior area A of the nominal four inch pipes). This construction is introduced smoothly during the first quarter of the turn, and the duct is reexpanded again in the last quarter of the turn—gradually (like a true Venturi which causes a flowing fluid to give up enthalpy energy for accelerating the flow as the Venturi constricts, but then lets it regain nearly all of this energy as it smoothly and gradually expands again).

Since riser ducts 24′ are very tall, a very wide base is needed to provide stability without support from the wall. The main bodies of upturn boxes 32′ are only 7.5 inches square, but their bases flare out to 12 inches width as best shown for box 32′ of J9 in FIG. 8. To obtain stability against tilting to and from the wall, the upturn box depends on the joint between box 32′ and return leg 20, see FIG. 12. Preferably, the boxes 32′ can be fabricated and sold with twelve inch lengths of four inch pipe already cemented and factory fired. Later these pipes can be sawed to any desired length in the field, and the less critical cemented joint to the turnaround made in the field. (It may even be found that the joint to the turnaround can be benefically left uncemented). As mentioned for return leg 20′ the half inch space between box 32′ and face 15 should be filled with soft or fibrous refractory material.

The riser ducts 24′ safely clear the impingement locus—see FIG. 9. The dishcarge means 42 at their top ends are somewhat related to discharge arrangements 26 of FIG. 1 and 35 of FIG. 4, but in those arrangements a pipe is sawed, capped, cemented and fired, then sold and finally field sawed and sandblasted. In discharge means 42, however, the pipe 24′ is first sawed with two oblique cuts angled as shown in FIG. 8, then capped with an oversize sharp-edged cap (which extends beyond the imaginary extrapolated surface of the pipe as shown in 42 of J7. These can be fabricated and sold with a few inches of excess length which is later cut off in the field (at the bottom end of the riser duct). FIG. 8 shows how trimming (by sandblasting) can adjust the discharge directions of the two discharge means 42 to be noticeably different from each other so as to cause clockwise or counterclockwise angular momentum unbalance (i.e. whirl forces) while still remaining substantially balanced with respect to their horizontal momentums to avoid displacing the flame's envelope (not shown) toward the left or right side of the chamber. Adjustment of the whirl momentums to balance these or unbalance them in either direction can alternatively be achieved in the field by cutting off the excess riser pipe lengths differently, so that one discharge means 42 is higher than the other.

In the embodiment of FIGS. 8-12, both the riser ducts are substantially taller than H, the height above the floor of the burner center line. Each of their discharge orifices 42 is at a height of about 1.25H. If trimmed to aim exactly at the center line, their discharge streams would aim downward at 30°. Thus, their combined downward momentum would be just enough to balance the upward momentum of one equivalent discharge aimed directly upward from below. Rough calculation indicates, however, that without some kind of damper the upward stream from discharge means 41 would deliver about 1.7 times as much momentum per second as that from discharge opening 42 of either riser. Butterfly dampers like 103 of FIG. 4 are incompatible with well-rounded entrance corners such as shown in FIG. 10; so five sliding drag screens 43 are used, which can be lowered completely below the three entrances of J-duct entrance legs 17 and below the two entrances of straight pipes 17* (all of these being well rounded to reduce headlosses). The drag screens are symbolically presented as having two mesh layers. But after the pipes 17, 20 and 17* have been roughly adjusted (by selecting internal-finned pipes per 13(a) 13(b) or 13(c)) one single layer of corrosion-resistant woven mesh or perforated metal may provide as much drag as necessary for fine final adjustment and for modulation. The selection of the fin patterns for the eight pipes can be based on headloss calculation or on cold air flow measurements without flame (plus compensating corrections to the primary air flow to compensate for the large difference between back pressure with and without a flame). Register 10' is a fully adjustable register which can adjust amount of primary air, round or flattened shape, and amount of whirl. The drag screens are actuated by a ganged control arrangement (not shown) which also varies a vortex type air restrictor on the blower intake and also controls fuel flow and atomizing air flow. (All not shown).

With three discharge regions about 120° apart (as seen in FIG. 8) momentum balance can be achieved with respect to both horizontal momentum per second (i.e. horizontal net force) and vertical momentum per second (vertical net force).

What we claim is:

1. In a heat producing system using a condensed-state fuel, and having a combustion chamber with a floor and a front wall pierced by an aperture, and having a pressurized plenum for producing a stream of primary air through such aperture, and having burner means for projecting very finely subdivided particles of said fuel into said air stream and for igniting these to produce in said aperture a flame exiting from said aperture into said chamber, said flame's outer-most envelope during normal operation (after startup) and said particles' outer-most envelope during startup defining respectively a normal impingement locus and a startup impingement locus, a secondary air preheating and delivery subsystem comprising a bulky duct structure assembled of a number of components of an ultra-conductive and long-lived but brittle ceramic-like refractory material, almost wholly consisting of silicon carbide, said material's brittleness and limited flexibility making it desirable that said bulky duct structure have multiple points of support from (but no more than one point of fixation to) said chamber, for maximum assured life in the system's environment of changing thermal distortions, said duct structure being plan-wise shaped like a J and being positioned with its longer leg extending through said wall and continuing back a substantial distance into said chamber and with its transverse leg lying essentially on said floor and extending in an overall direction roughly crosswise to said entrance leg and with its return leg extending generally forward almost to said front wall (but not bearing against it), all said legs being wholly outside of and in front of at least one of said impingement loci; means for feeding secondary air to be preheated into said longer leg, and delivery means for discharging the preheated air from said return leg at a discharge point which is adjacent said wall and plan-wise near the forward end of said return leg, with its discharge velocity in one of the many directions which cause a substantial fraction of said air to meet the flame near the latter's exit from said aperture into said chamber.

2. In a system per claim 1, a subsystem per claim 1, wherein said substantial fraction of said air is at least one half of said air.

3. In a system per claim 1, a subsystem per claim 1, wherein said substantial fraction of said air is about 20% to 40% of said air.

4. In a heat producing system using a condensed state fuel and having a combustion chamber with a floor and a front wall pierced by an aperture, and having a plenum for producing a stream of primary air through said aperture, and having burner means for projecting very finely subdivided particles of said fuel into said air stream, thus producing in said aperture a flammable fuel-air mix exiting from said aperture into said chamber, and for igniting this mix to produce within said chamber a fuel-rich flame which requires immediate supplemental air for good combustion, a secondary-air preheating and delivery subsystem comprising a bulky duct structure put together in the field from components fabricated of an ultra-conductive and long-lived but inelastic and brittle material and field-joined by cementing and firing with a firable cement yielding inelastic and brittle joints, said cement and said material having such ceramic-like and masonry-like characteristics that large structures field assembled therefrom require inherent stability (like good structures of masonry—not wholly dependent on the strength of their cemented joints) to assure long life in the system's severe environment of changing thermal distortions, said duct structure being plan-wise J-shaped and being positioned with its longer leg extending in through said wall and continuing back a substantial distance into said chamber, and with its transverse leg lying essentially on said floor and extending in an overall direction approximately parallel to said wall, and with its shorter return leg extending forward to a point adjacent (but not bearing against) said wall, this return leg being wholly supported from said floor, means for feeding into said longer duct-leg secondary air to be preheated, and delivery means for releasing the preheated air from said return leg at a delivery location plan-wise close to said "point adjacent said wall", with a mean discharge velocity roughly corresponding to one of the vectors contained in a quadrant bounded by $V_1$ (a centripetal unit vector extending from said location parallel to said wall toward the center line of said aperture) and $V_2$ a forwardly directed unit vector extending horizontally from said location perpendicular to said wall, whereby a substantial fraction of said preheated air meets said fuel-rich flame less than half an aperture-diameter downstream from the inner face of said wall.

5. In an oil-fired heat-producing system having a combustion chamber with a refractory floor and a refractory front wall pierced by a conically flaring aperture, and having a wind box adjacent said wall for forcing air through said aperture to produce a conically expanding stream of primary air, and having burner means for projecting atomized oil into said air stream and for igniting it to form a flame exiting conically from said aperture into said chamber, a secondary-air preheating and delivery subsystem which comprises at least one plan-wise J-shaped duct structure made of an ultra-conductive long-lived but brittle ceramic-like refractory material, said J structure including an entrance duct-leg extending from the wind box through the wall to the chamber and continuing a substantial distance rearward into said chamber to carry secondary air further back into said chamber while preheating said air, a transverse duct-leg lying essentially on said floor and connected to said entrance leg for receiving preheated air therefrom, this transverse leg extending along said floor in an overall direction approximately parallel to said wall for reversing the direction of said air while further heating it, a return duct leg connected to said transverse leg to receive said further-heated air therefrom and extending forward to carry said air to a point adjacent the inner face of said wall while still further heating said air, said return duct-leg terminating in discharge means for causing a substantial fraction of said air to flow along a path which meets said flame near its exit from said aperture.

6. In an oil-fired heat-producing system having a combustion chamber with a refractory floor and a refractory front wall pierced by a conically flaring aperture, and having a wind box adjacent said wall for forcing air through said aperture to produce a conically expanding stream of primary air, and having burner means for projecting atomized oil into said air stream and for igniting it to form a flame exiting conically from said aperture into said chamber, a secondary-air preheating and delivery subsystem which comprises at least one plan-wise J-shaped duct structure made of an ultra-conductive long-lived but brittle ceramic-like refractory material, said J structure including an entrance duct-leg extending from the wind box through the wall to the chamber and continuing a substantial distance rearward into said chamber to carry secondary air further back into said chamber while preheating said air, a transverse duct-leg lying essentially on said floor and connected to said entrance leg for receiving preheated air therefrom, this transverse leg extending along said floor in an overall direction approximately parallel to said wall for reversing the direction of said air while further heating it, a return duct-leg connected to said transverse leg to receive further heated air therefrom and extending forward to carry said air to a point adjacent the inner face of said wall and planwise within 0.6H of said aperture's center line while still further heating said air, said return duct-leg terminating in discharge means which consist of a simple opening shaped and oriented to cause a substantial fraction of said air to flow along a path which meets said flame near its exit from said aperture: (H being the height of said aperture's center line).

7. In a system per claim 6 a subsystem per claim 6 wherein said return leg lies essentially on the floor, and wherein said simple opening in which this leg terminates is an open end as if squarely cut-off which projects the still-further-heated air horizontally at the base of the wall's hot inner face, thereby causing most of this air to fan out generally upward along said hot face (gaining more heat therefrom), whereby a substantial fraction of the air is entrained by the induced suction of said rapidly-exiting flame and thus joins the flame near its exit.

8. In a system per claim 6 a subsystem per claim 6 wherein said return leg slopes up at a substantial angle from said transverse leg to said point adjacent the inner face of said wall, and wherein said simple opening in which this leg terminates is an open end as if formed by two planar cuts one of which is parallel to said face and sufficiently close to it to be practically sealed by said wall, the resulting opening being oriented to project said still-further-heated air slanting upward and forward to flatten against said face while flowing upward along it (gaining more heat from said wall) whereby most of said air meets said flame close to its exit from said aperture.

9. In a system per claim 6 a subsystem per claim 6 wherein said return leg lies essentially on the floor and wherein said simple opening in which this leg terminates is an open end as if sealed by a matching plug cemented in the end of the duct, then reopened by an inclined planar cut and sandblasted to round the resulting knife-edge of the obliquely cut pipe-wall.

10. In an oil-fired heat-producing system having a combustion chamber with a refractory floor and a refractory front wall pierced by a conically flaring aperture, and having a wind box adjacent said wall for forcing air through said aperture to produce a conically expanding stream of primary air, and having burner means for projecting atomized oil into said air stream and for igniting it to form a flame exiting conically from said aperture into said chamber, a secondary-air preheating and delivery subsystem which comprises at least one plan-wise J-shaped duct structure made of an ultra-conductive long-lived but brittle ceramic-like refractory material, said J structure including an entrance duct-leg extending from the wind box through the wall to the chamber and continuing a substantial distance rearward into said chamber to carry secondary air further back into said chamber while preheating said air, a transverse duct-leg lying essentially on said floor and connected to said entrance leg for receiving preheated air therefrom, this transverse leg extending along said floor in an overall direction approximately parallel to said wall for reversing the direction of said air while further heating it, a return duct-leg connected to said transverse leg to receive said further heated air therefrom and extending forward to carry said air to a point adjacent the inner face of said wall while still further heating said air, said return duct-leg terminating in a riser-type discharge unit including (a) an up-elbow with a stable base resting essentially on the floor, and (b) an approximately vertical riser duct connected thereto to carry said still-further-heated air upward while giving it additional heat, said riser duct having adjacent its upper end a discharge opening shaped and oriented to project said additionally heated air in such a direction that a substantial fraction of said air meets said flame near its exit from said aperture.

11. In a system per claim 10 a subsystem per claim 10 wherein said "point adjacent the inner face of said wall" is plan-wise within 0.5H of said aperture's center line and wherein said discharge opening of said riser duct is less than 0.7H above said floor, and wherein the shape and orientation of said opening directs the air toward said flame in a largely upward direction (H being the height above the floor of the aperture's center line).

12. In a system per claim 11 a subsystem per claim 11 wherein said riser duct is mounted on said up-elbow with rotational freedom about an axis in said up-elbow and the discharge opening of such riser duct is inclined with respect to said axis, whereby the direction of said discharge may at least temporarily be swung conically to adjust its inclination toward or away from said inner face of said wall, and wherein said elbow rests on the floor via changeable shims and its attachment (via said return duct leg) to said transverse leg leaves it freedom to be swung parallel to said wall to enable separate adjustment of the discharge's inclination about an axis roughly parallel to the aperture's center line for increasing or decreasing the swirl given to the flame by such adjustable discharge.

13. In a system per claim 12 a subsystem per claim 12 wherein said rotational freedom about an axis in said up-elbow and said freedom to be tilted parallel to said wall are adapted to be conveniently immobilized after optimum adjustments are established.

14. In a system per claim 10 a subsystem per claim 10 wherein said "discharge opening adjacent its upper end" is plan-wise more than 0.4H from said aperture's center line, and wherein the above-floor height of said discharge opening of said riser duct is greater than 0.7H but less than H plus 1.3 times the plan-wise displacement of said point from said aperture's center line and wherein said opening is shaped and oriented to project such additionally heated air in a largely horizontal direction, thereby tending to deflect the envelope of said flame asymmetically as seen in plan.

15. In a system per claim 14 a subsystem per claim 14 which (in addition to "at least one plan-wise-J-shaped structure" (as recited in claim 5) further comprises at least one more such plan-wise-J-shaped structure also of a type according to claim 14 and wherein the discharges from all such J-shaped structures are balanced in respect to their horizontal momentums to give no substantial net asymmetric horizontal deflection to the flame's envelope.

16. In a heat producing sysem using a condensed-state fuel and a combustion chamber with a floor and a front wall pierced by an aperture, and having means for producing a high volume low pressure stream of primary air through said aperture, and having burner means for projecting very finely dispersed particles of said fuel into said air stream and for igniting these to produce in said aperture a flame exiting from said aperture into said chamber, a secondary air preheating and delivery subsystem including a plurality of at least three J-ducts made of an ultra-conductive and long-lived but brittle ceramic-like refractory material, each of such J-ducts being plan-wise J-shaped and being positioned with its longer "entrance" leg extending in through said wall to the chamber and continuing back a substantial distance into said chamber, and with its transverse leg lying essentially on the floor, and extending generally transversely—i.e. approximately parallel to the wall—and each J-duct being positioned with its return leg extended forward from its transverse leg to a specific point near the wall individual to that J-duct, means for feeding air to be preheated into each of said entrance legs, and delivery means for discharging the preheated air from the return leg of each J-duct at a discharge point adjacent said wall and plan-wise within half an aperture diameter from said specific point individual to that J-duct, and with a velocity within 35° of parallel to said wall and aimed toward said flame, said discharge points of said plurality of J-ducts being distributed around said flame so that at least one is substantially above and at least one substantially below the aperture's center line, and being approximately symmetrically disposed plan-wise, so that for each release point substantially to one side of the center line there is a corresponding release point substantially to the other side of it, the velocities and mass flows being adjusted to approximately balance the horizontal momentums and also roughly balance the vertical momentums given to the flame.

17. In an oil-fired boiler having a combustion chamber with a floor and a front wall pierced by an aperture, and having a pressurized plenum for producing a stream of primary air through such aperture, and having burner means for projecting very finely subdivided particles of said fuel into said air stream and for igniting these to produce in said aperture a flame exiting from said aperture into said chamber, a secondary air preheating and delivery system comprising a bulky duct structure assembled of a number of components of an ultra-conductive and long-lived but brittle ceramic-like refractory material, said duct structure being plan-wise shaped like a J and being positioned with its longer leg extending through said wall and continuing back a substantial distance into said chamber and with its transverse leg lying essentially on said floor and extending generally approximately parallel to said wall and with its return leg extending forward to a point near said front wall; means for feeding into said longer leg secondary air to be preheated; and delivery means for releasing the preheated air from said return leg at a delivery location plan-wise at or adjacent said "point near said front wall", with velocities whose mean roughly corresponds to one of the 90° fan of vectors bounded by $V_1$ and $V_2$, whereby a substantial fraction of said preheated air meets said flame near its exit into said chamber (where $V_1$ is a centripetal vector from said delivery location parallel to said wall toward the center line of said aperture, and $V_2$ is a forwardly-directed vector from said location perpendicular to said wall).

18. In a system per claim 17, a subsystem per claim 17, wherein said return leg lies essentially on the floor (e.g. leg 20 of J4 FIG. 1) and said delivery location is substantially at said "point near said front-wall" (i.e. substantially at floor level) and wherein said mean velocity corresponds to $V_2$ (i.e. horizontal and perpendicular to said wall.

19. In a system per claim 17, a subsystem per claim 17, wherein said return leg lies essentially on the floor (e.g. leg 20 of J1 FIG. 1) and said delivery location is (in all three dimensions) substantially at said "point near said front-wall" (i.e. substantially at floor level) and with velocities whose mean direction is substantially closer to $V_1$ than to $V_2$ (i.e. roughly 40° or less from parallel to the wall).

20. In an oil-fired boiler having a combustion chamber with a floor and a front wall pierced by an aperture, and having a pressurized plenum for producing a stream of primary air through such aperture, and having burner means for projecting very finely subdivided particles of said fuel into said air stream and for igniting these to produce in said aperture a flame exiting from said aperture into said chamber, a secondary air preheating and delivery system comprising a bulky duct structure assembled of a number of components of an ultra-conductive and long-lived but brittle ceramic-like refractory material, said duct structure being plan-wise shaped like a J and being positioned with its longer leg extending through said wall and continuing back a substantial distance into said chamber and with its transverse leg lying essentially on said floor and extending generally approximately parallel to said wall and with its return leg (e.g. leg 20 of J8 FIGS. 8, 9, 11) extending forward while sloping up at a substantial angle from said transverse leg to a point near said front wall; means for feeding into said longer leg secondary air to be preheated; and delivery means for releasing the preheated air from said return leg at a delivery location and wherein said delivery location substantially at that point (not only plan-wise but also in respect to height above floor) with velocities whose mean roughly corresponds to one of the 90° fan of vectors bounded by $V_1$ and $V_2$—said mean also being closer to $V_1$ than to $V_2$, whereby a substantial fraction of said preheated air meets said flame near its exit into said chamber (where $V_1$ is a centripetal vector from said delivery location parallel to said wall toward the center line of said aperture, and $V_2$ is a forwardly-directed vector from said location perpendicular to said wall).

21. In an oil-fired boiler having a combustion chamber with a floor and a front wall pierced by an aperture, and having a pressurized plenum for producing a stream of primary air through such aperture, and having burner means for projecting very finely subdivided particles of said fuel into said air stream and for igniting these to produce in said aperture a flame exiting from said aperture into said chamber, a secondary air preheating and delivery system comprising a bulky duct structure assembled of a number of components of an ultra-conductive and long-lived but brittle ceramic-like refractory material, said duct structure being plan-wise shaped like a J and being positioned with its longer leg extending through said wall and continuing back a substantial distance into said chamber and with its transverse leg lying essentially on said floor and extending generally approximately parallel to said wall and with its return leg (e.g. leg 20 of J2 FIG. 1, of J5 FIG. 4, or of J7 FIG. 8) lying essentially on the floor and extending forward to a point near said front wall; means for feeding into said longer leg secondary air to be preheated; and delivery means which include riser ducts (e.g. 24 of J2 FIG. 1, or 32 and 33 of J5 FIG. 5, or 24' of J7 FIG. 3) to carry the preheated air from said return leg to and release it at a delivery location considerably higher than said "point near said front wall" but plan-wise at or adjacent thereto, and wherein the mean of the velocities of the released air is close to $V_1$ (where $V_1$ is a centripetal vector from said delivery location parallel to said wall toward the center line of the aperture).

22. In an oil-fired heat-producing system having a combustion chamber with a refractory floor and a refractory front wall pierced by a conically flaring aperture, and having a wind box adjacent said wall for forcing air through said aperture to produce a conically expanding stream of primary air, and having burner means for projecting atomized oil into said air stream and for igniting it to form a flame exiting conically from said aperture into said chamber (the extrapolated extension of said conically flaring aperture, and the bounding envelope of said projected atomized oil defining respectively a rule-of-thumb impingement locus, and an actual operational impingement locus), a secondary-air preheating and delivery subsystem which comprises at least one plan-wise J-shaped duct structure made of an ultra-conductive long-lived but brittle ceramic-like refractory material, said J structure including an entrance duct-leg extending from the wind box through the wall to the chamber and continuing a substantial distance rearward into said chamber to carry secondary air further back into said chamber while preheating said air, a transverse duct-leg lying essentially on said floor and connected to said entrance leg for receiving preheated air therefrom, this transverse leg extending along said floor in an overall direction approximately parallel to said wall for reversing the direction of said air while further heating it, a return duct leg connected to said transverse leg to receive said further heated air therefrom and extending forward to carry said air to a point adjacent the inner face of said wall while still further heating and air, said point adjacent the inner face and all said duct legs being in front of and outside of at least one of said impingement loci, and said return duct leg terminating in discharge means for causing a substantial fraction of said air to meet said flame near the latter's exit from said aperture.

23. In an oil-fired heat-producing system having a combustion chamber with a refractory floor and a refractory front wall pierced by a conically flaring aperture, and having a wind box adjacent said wall for forcing air through said aperture to produce a conically expanding stream of primary air, and having gun type burner means for projecting atomized oil into said air stream and for igniting it to form a flame exiting conically from said aperture into said chamber (the extrapolated extension of said conically flaring aperture, and the bounding envelope of said projected atomized oil during normal operation defining respectively a rule-of-thumb impingement locus, and an actual operational impingement locus), a secondary-air preheating and delivery subsystem suitable to be retrofitted economically into heat-producing systems not initially constructed with such subsystems incorporated therein which comprises at least one plan-wise J-shaped duct structure made of an ultra-conductive long-lived but brittle ceramic-like refractory material, said J structure including an entrance duct-leg extending from the wind box through the wall to the chamber and continuing a substantial distance rearward into said chamber to carry secondary air further back into said chamber while preheating said air, a transverse duct-leg lying essentially on said floor and connected to said entrance leg for receiving preheated air therefrom, this transverse leg extending along said floor in an overall direction roughly transverse to said entrance leg for transporting said air transversely and approximately reversing its direction while further heating it, a return duct-leg connected to said transverse leg to receive said further heated air therefrom and extending forward to carry said air to a point adjacent the inner face of said wall while still further heating said air, said return duct-leg terminating in discharge means for releasing most of said air at a release location adjacent said inner face (and plan-wise substantially at said point) with velocities such as to cause a substantial fraction of said released air to meet said flame near its exit from said aperture, all said ducts as well as said discharge means being in front of and outside of at least one of said impingement loci.

* * * * *